(12) United States Patent
van Ooyen et al.

(10) Patent No.: US 9,242,794 B2
(45) Date of Patent: Jan. 26, 2016

(54) METHOD FOR PICKING A PACKAGE

(71) Applicants: Wes van Ooyen, Burlington (CA); Todd Willick, Mississuaga (CA); Derek Bessette, Milton (CA)

(72) Inventors: Wes van Ooyen, Burlington (CA); Todd Willick, Mississuaga (CA); Derek Bessette, Milton (CA)

(73) Assignee: MedAvail, Inc., San Francisco, CA (US)

( * ) Notice: Subject to any disclaimer, the term of this patent is extended or adjusted under 35 U.S.C. 154(b) by 409 days.

(21) Appl. No.: 13/914,425

(22) Filed: Jun. 10, 2013

(65) Prior Publication Data

US 2014/0154044 A1 Jun. 5, 2014

Related U.S. Application Data

(63) Continuation of application No. 12/503,989, filed on Jul. 16, 2009, now Pat. No. 8,465,243.

(51) Int. Cl.
*B65G 1/04* (2006.01)

(52) U.S. Cl.
CPC ............... *B65G 1/04* (2013.01); *B65G 1/0435* (2013.01)

(58) Field of Classification Search
CPC ..................................................... B65G 1/0435
USPC ................... 414/277, 280, 281; 242/390
See application file for complete search history.

(56) References Cited

U.S. PATENT DOCUMENTS

| | | | | |
|---|---|---|---|---|
| 3,632,001 A | * | 1/1972 | Richens | B65G 1/0435 105/75 |
| 4,063,653 A | * | 12/1977 | Halada | B65G 1/0442 414/277 |
| 5,226,782 A | * | 7/1993 | Rigling | B65G 1/0407 198/347.3 |
| 5,875,987 A | * | 3/1999 | Pullen | G01B 3/1005 242/379 |

* cited by examiner

*Primary Examiner* — Jonathan Snelting
(74) *Attorney, Agent, or Firm* — Bradley K. DeSandro; DeSandro Law Group PLLC

(57) ABSTRACT

A storage apparatus has an rack of storage bins, a pick head drive unit to drive a pick head to an access location for a selected bin, and a platform drive unit to drive a platform forming part of the pick head into and out of the rack to pick or load packages at a selected bin of the rack. The platform has a cam formation which, in the course of entry of the platform into the rack acting to lift a desired package until the platform reaches a clearance position at which the cam formation clears the package. Subsequent withdrawal of the platform from the rack acts to drag the desired package from the selected bin.

20 Claims, 12 Drawing Sheets

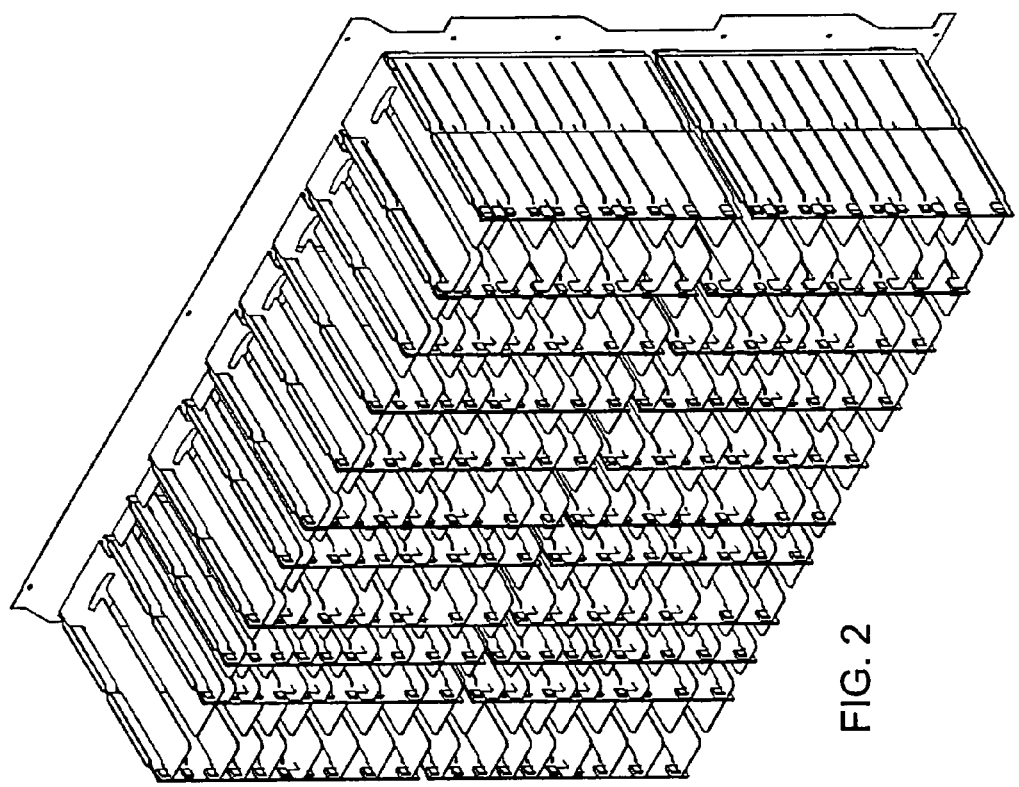
FIG. 2

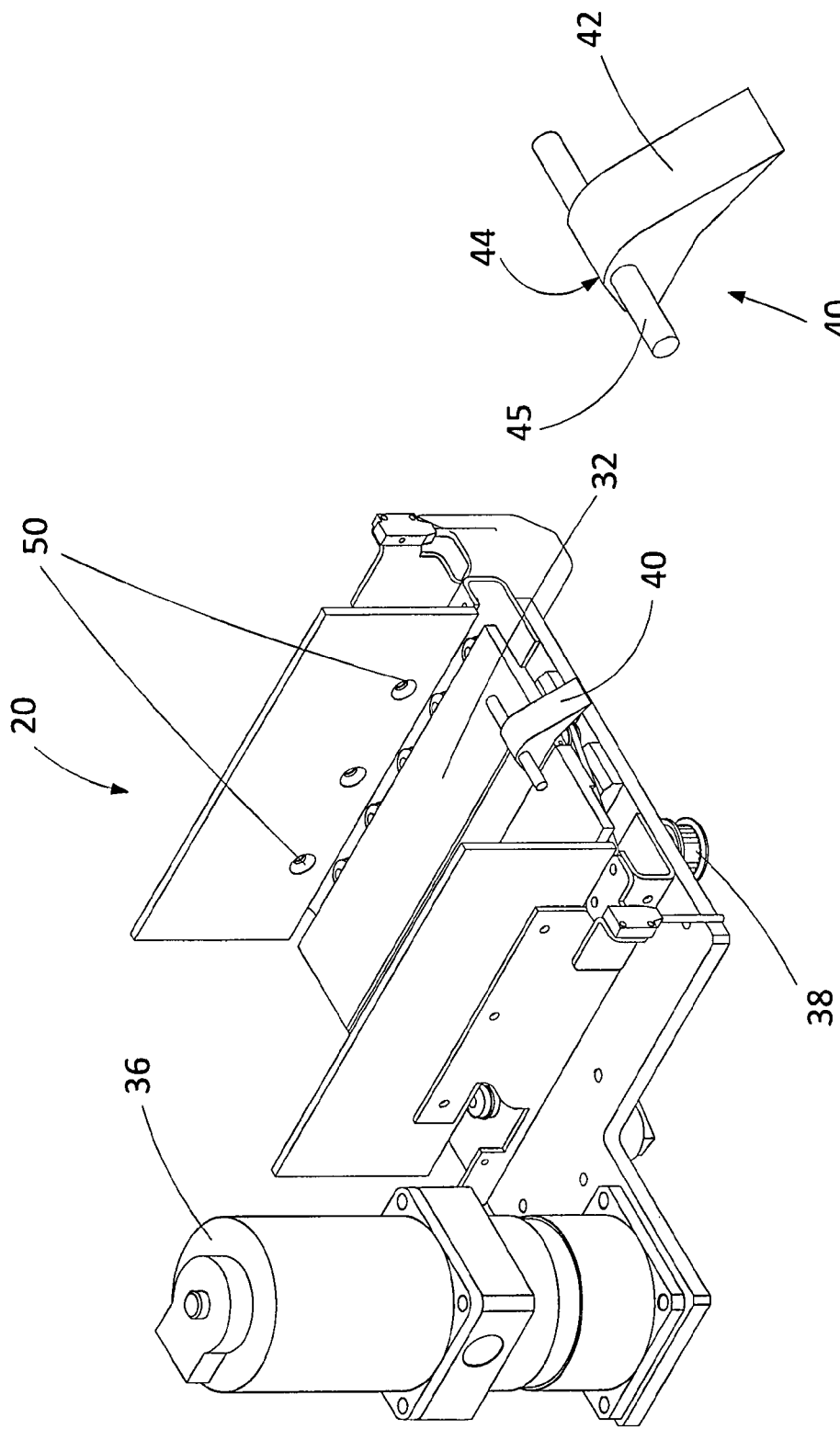

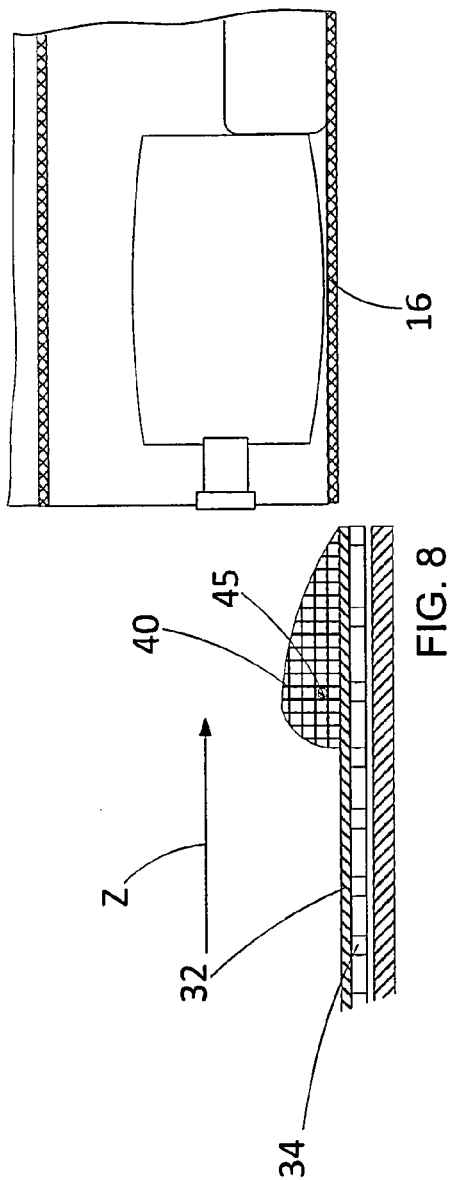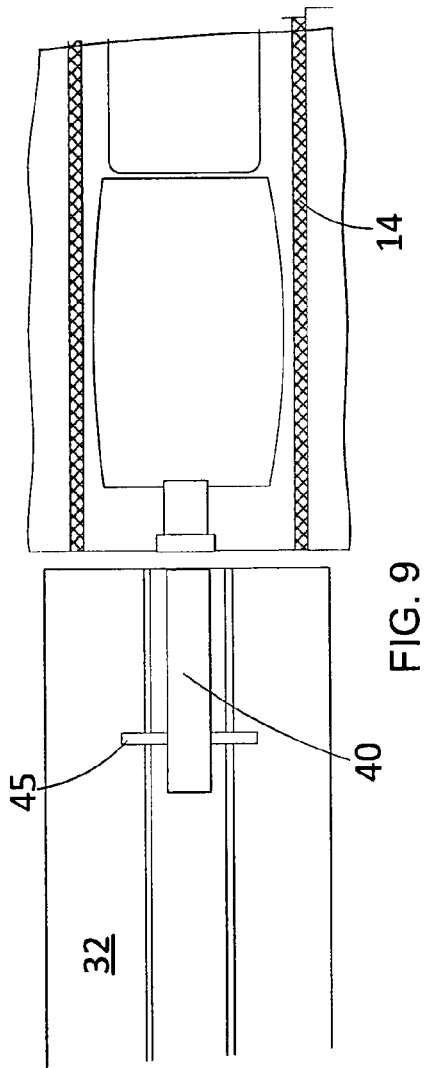

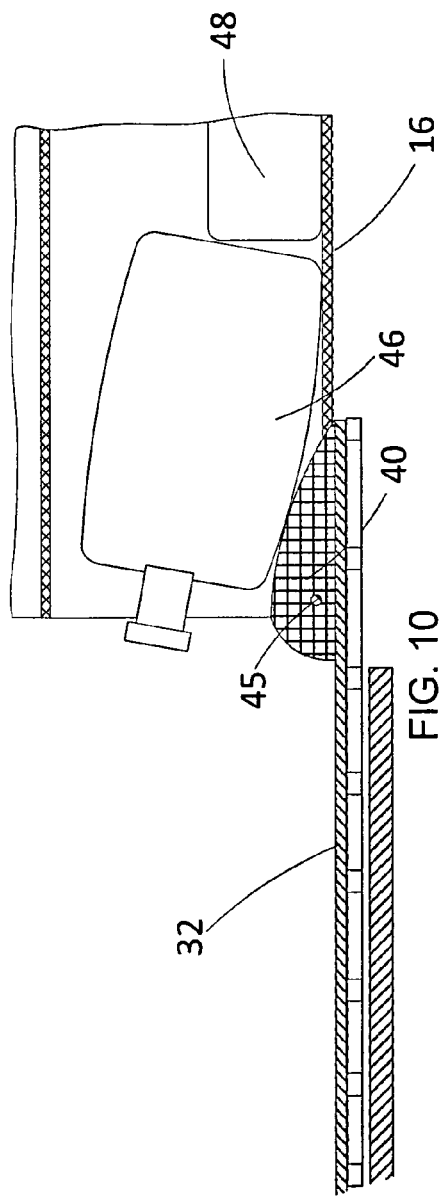
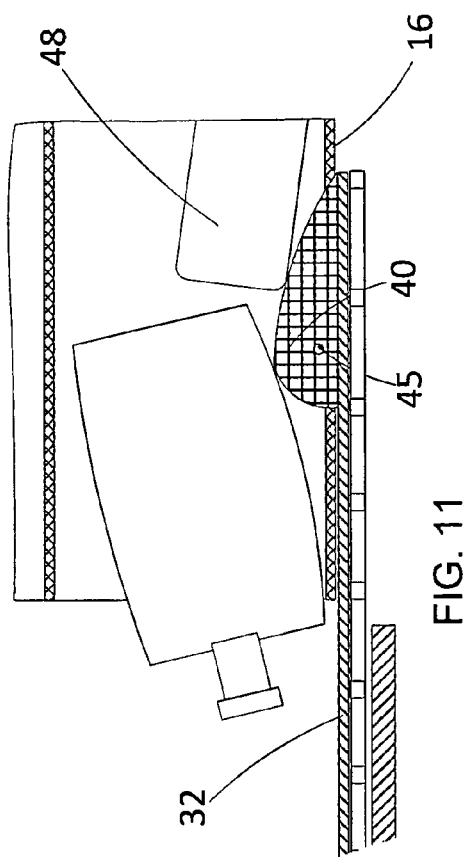

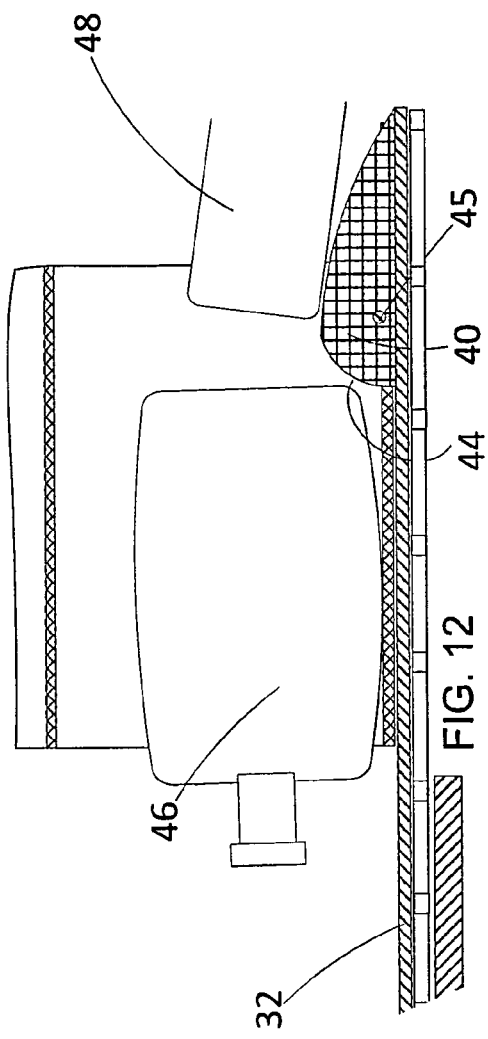
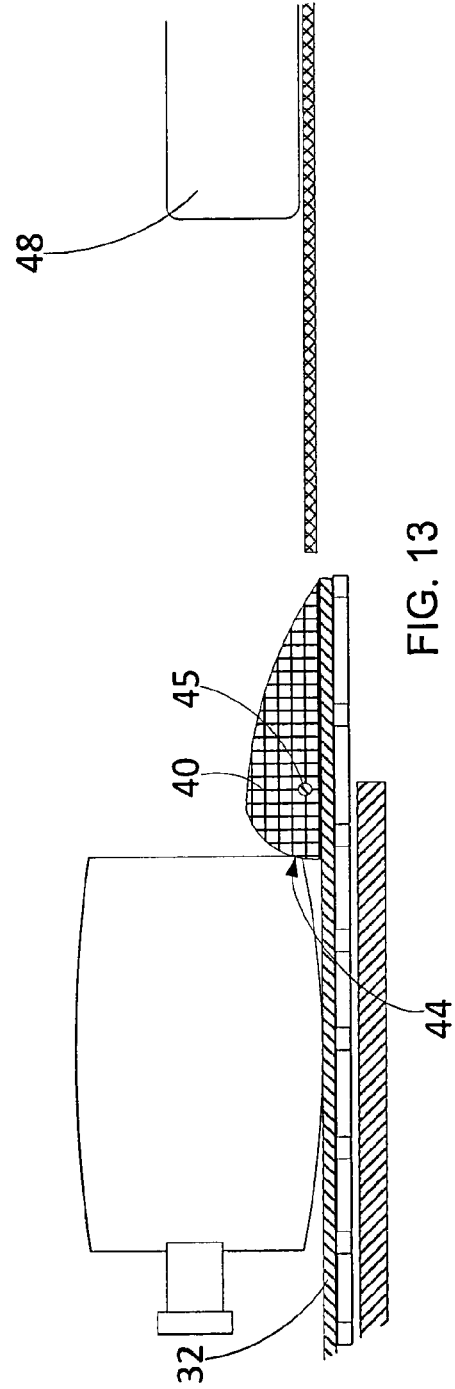

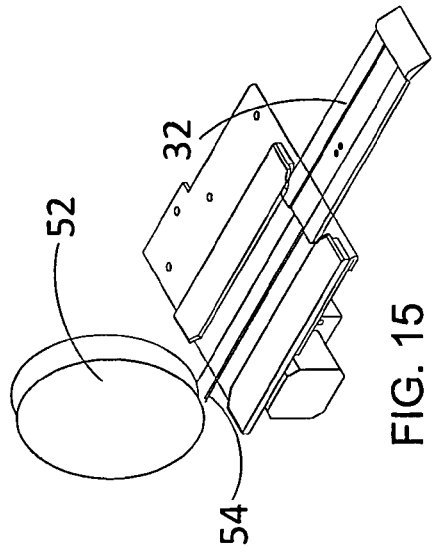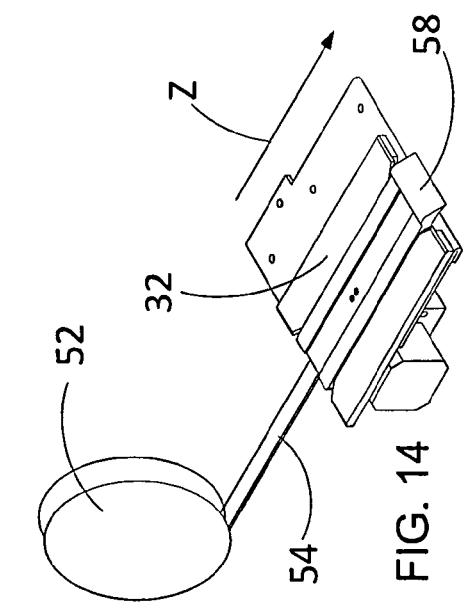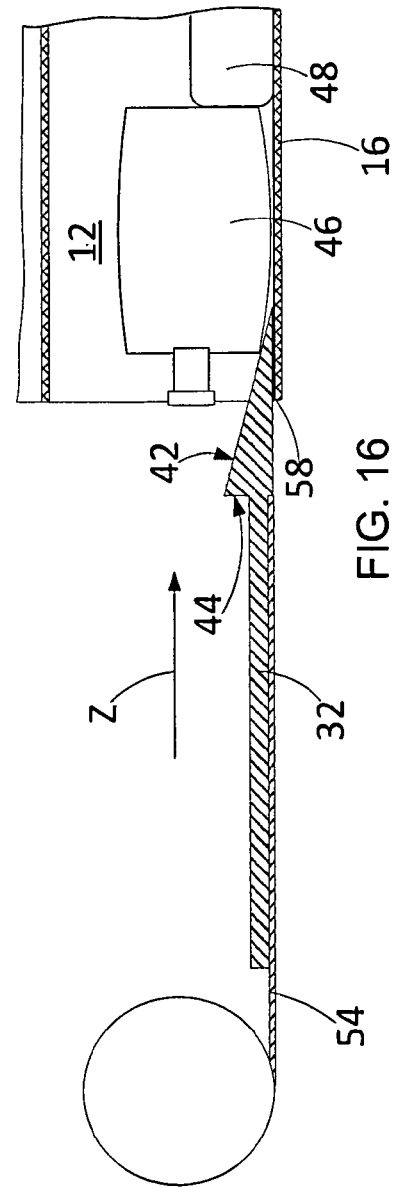

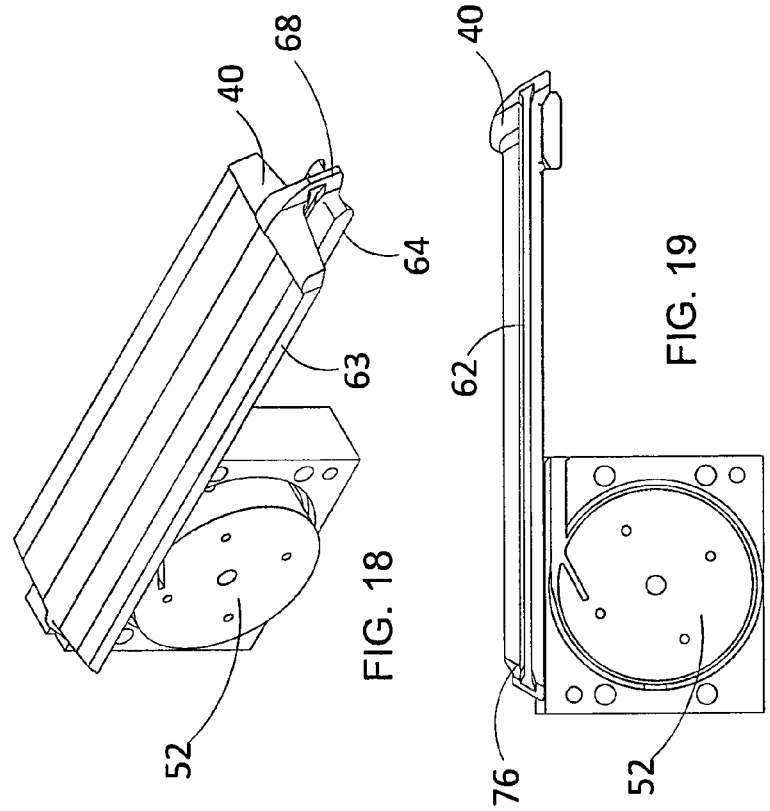
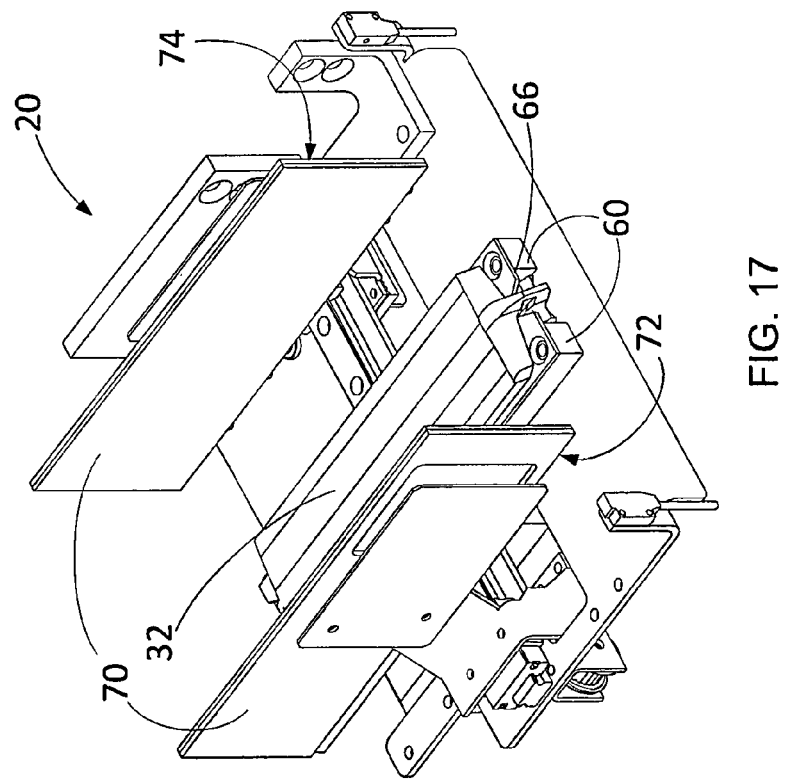

METHOD FOR PICKING A PACKAGE

CROSS-REFERENCE TO RELATED APPLICATIONS

This is a continuation of application of U.S. patent application Ser. No. 12/503,989, filed on Jul. 16, 2009, titled "Method and Apparatus for Picking A Package From A Dispensing Machine," now U.S. Pat. No. 8,465,243, which is incorporated herein by reference.

FIELD

This invention relates to storage apparatus including a pick head arrangement for a package dispensing system. It has particular application for picking and loading medicament products, such as drugs, at a medicament dispensary kiosk.

BACKGROUND

Medicament packages to be dispensed at a robotically controlled dispensing kiosk may be prepackaged pill boxes, bottles or the like having a range of sizes, shapes, weight, weight distribution and surface condition, all of which may create handling problems for a robotic system. Drug companies frequently change packaging, so control algorithms may become ineffective if a control algorithm is based on the product packaging. A control algorithm that prescribes a handling method based solely on pre-recorded product package information (weight, size, etc) is prone to error. To reduce package handling problems, uniform style and shape of outer-packaging can be applied to medicament products, although this is not preferred as it adds additional handling and expense, may introduce other errors, and results in extra packaging materials. Ideally, the control algorithms and the package handling hardware utilized throughout a package picking process should be as flexible as possible commensurate with other demands of the dispensary kiosk.

In known medicament dispensary kiosks for dispensing bottles or packages of drugs or other medicament packages, the packages are typically stacked in a row column rack of bins. To pick a package from a bin, a pick head is driven in X and Y directions to a desired XY position corresponding to the selected bin. A platform forming part of the pick head is then moved in the Z direction to pick the package from the selected bin.

In a prior implementation of a pick head as described in our copending Canadian patent application serial number 2,639,239, with a pick head at a desired XY position and a platform adjacent the target bin, the platform is moved to a position underlying a slot formed in a lower wall of the target bin. In the package pick action, after the platform is driven a sufficient distance rearwardly in the Z direction, the platform is raised so that an upwardly extending hook on the platform is brought to a position immediately behind the package to be picked. The package to be picked is then hooked out of the selected bin by driving the platform forwardly out of the rack of bins.

Once the picked package is on the platform, further investigation is made to ensure the package is really the one whose selection is desired. Typically, this might include checking a bar code affixed to the package and/or examining physical characteristics of the package such as its shape or weight. The platform, with the package supported upon it, is then moved to a rest position on the pick head whereupon the pick head is driven to another part of the apparatus as part of the dispensing procedure.

Within a medicament storage kiosk of the type described in the copending Canadian patent application 2,639,239, it is desirable to have the pick head and its operation occupy a small space so that as much rack space as possible can be used for the storage of medicaments. In the pick operation described previously, the raising of the platform once it has been driven under a bin means that a layer of space under each row of bins must be reserved. In addition, the 3-part platform movement—platform moves rearwardly, platform moves upwardly, platform moves forwardly—is a relatively complex procedure.

It would be valuable if at least a part of the layers of space under each row of bins which are reserved as the platform lifting space could be used for further storage. It would be valuable also if a simpler procedure could be implemented for picking packages from the bins.

SUMMARY

According to one aspect of the invention, there is provided a storage apparatus comprising a rack of storage bins, a pick head including a platform, a pick head drive unit to drive the pick head to an access location corresponding to a selected bin, and a platform drive unit to drive the platform into and out of the rack from the access location, the platform having a cam formation for lifting a package stored in the selected bin when the platform reaches an actuation position in the course of the platform entry, the platform having an engagement means to enagage the selected package when the platform reaches a withdrawal position in the course of platform entry, the engagement means in the course of the platform exit, acting to drag the package out of the selected bin.

According to another aspect of the invention, there is provided a method for picking a package stored in a selected bin of a rack of storage bins, the method comprising operating a pick head drive unit to drive a pick head to an access location corresponding to the selected bin, operating a platform drive unit to drive the platform into and out of the rack from the access location, by means of a cam formation on the platform lifting a package stored in the selected bin when the platform reaches an actuation position in the course of the platform entry, by means of an engagement means on the platform engaging the selected package when the platform reaches a withdrawal position in the course of platform entry, and by means of the engagement between the engagement means and the package dragging the package out of the selected bin in the course of the platform exit from the rack.

BRIEF DESCRIPTION OF THE DRAWINGS

For simplicity and clarity of illustration, elements illustrated in the following figures are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 2 is a perspective view of a bin rack forming part of the storage apparatus of FIG. 1;

FIG. 5 is a perspective view of one embodiment of pick head for use in picking items from a storage bin;

FIG. 6 is scrap view of a part of the platform of FIG. 5;

FIG. 8 is a longitudinal sectional view through part of the pick head and adjacent storage bin according to an embodiment of the invention;

FIG. 9 is a top view corresponding to FIG. 8;

FIG. 10 is a longitudinal sectional view corresponding to the view of FIG. 8, but showing a platform forming part of the pick head in a rearward position;

FIG. 11 is a longitudinal sectional view corresponding to the view of FIG. 8, but showing the platform in a more rearward position;

FIG. 12 is a longitudinal sectional view corresponding to the view of FIG. 8, but showing the platform in a package drop position;

FIG. 13 is a longitudinal sectional view corresponding to the view of FIG. 8 but showing the pick head and picked package retrieved from a bin rack;

FIG. 14 is a perspective view of a pick head according to another embodiment of the invention, the arrangement shown with a platform forming part of the pick head in an unextended condition;

FIG. 15 is a perspective view corresponding to FIG. 14 but showing the platform in an extended condition;

FIG. 16 is a longitudinal sectional view corresponding to the views of FIGS. 14 and 15.

FIG. 17 is a perspective view of a pick head according to a further embodiment of the invention, the arrangement shown with a platform forming part of the pick head in an unextended condition;

FIG. 18 is a perspective view of a platform and spool arrangement forming a part of the FIG. 17 embodiment;

FIG. 19 is a side view of the platform and spool arrangement of FIG. 18;

DETAILED DESCRIPTION

Figure 1:
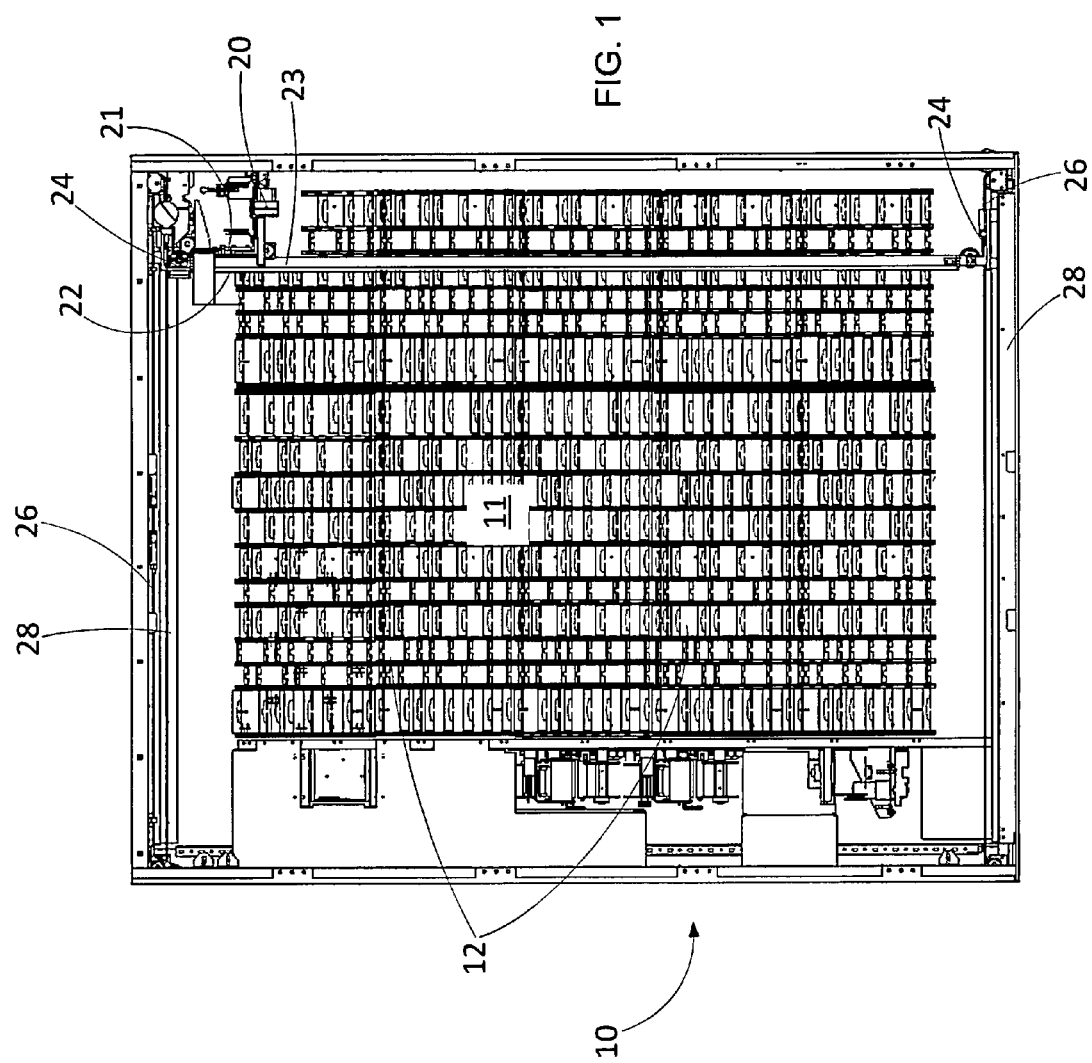
FIG. 1 is a front view of a storage apparatus for a package dispensing kiosk according to one embodiment of the invention.

Referring in detail to FIGS. 1 and 2, there is shown a cabinet 10 for a dispensing kiosk, the cabinet having a rack 11 of storage bins 12 arranged in a row and column array. The bins may be of a uniform shape and size or, as shown, may vary in shape and size to accommodate different sizes of packages to be dispensed. Particularly for the application envisioned for the present invention, the rack of storage bins is formed as a secure back end medicament storage vault. The storage vault is in use combined with a front end unit (not shown) which bars unauthorized access to the drug vault but which can be opened to expose the drug vault for servicing. Mounted in the front end unit is an interface unit (not shown) at which a user, can enter data, communicate with a remote expertise or data records through a data or teleconference link, and collect dispensed packages, etc.

Figure 4:
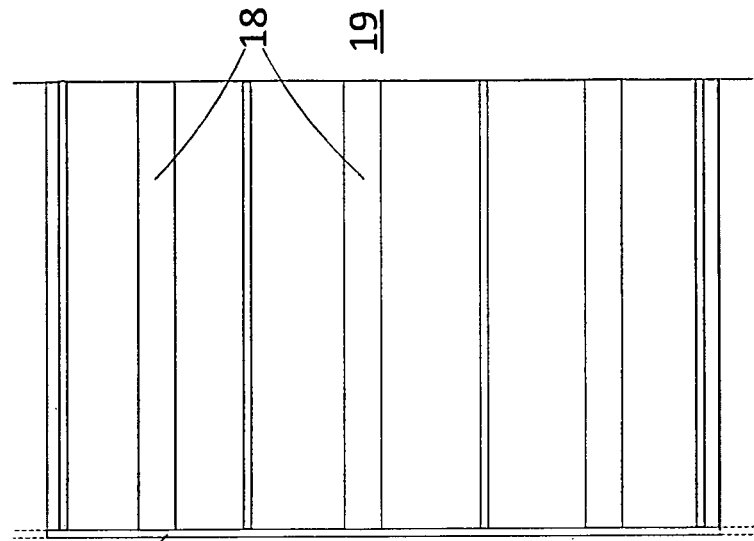
FIG. 4 shows a top view of the detail of FIG. 3.
Figure 3:
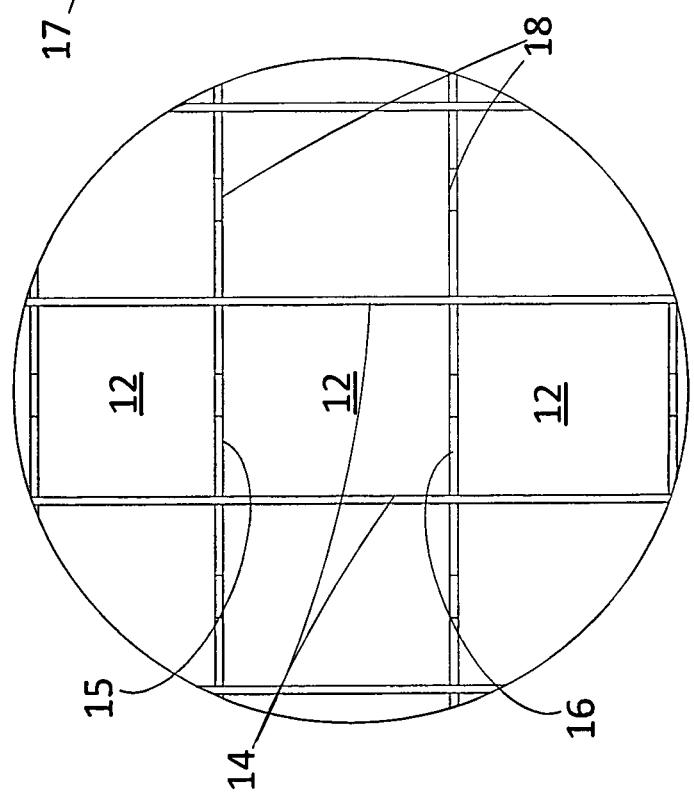
FIG. 3 shows a detail from the front of a rack of bins forming part of the storage apparatus of FIG. 1.

As shown in FIGS. 3 and 4, each bin has a pair of side walls 14 with the side walls of inner ones of the bins also being the side walls of immediately laterally adjacent bins. Similarly, each bin has an upper wall 15 and a lower wall or floor 16, with the upper and lower walls of the inner bins forming the lower and upper walls of immediately vertically adjacent bins. The rack of bins has a rear wall 17 extending the full extent of the array although, as an alternative, stub rear walls can be used for each row of bins in place of the fully extending rear wall. The bins have a front to back depth typically to accommodate a row of four packages. In a typical application, these are pill boxes or bottles, but may also be bottles containing dispensed liquid medicaments or may be different packages entirely. An embodiment of the invention relates to the manner of picking a package, which may be a single package within a bin or which may be the first package of a vertical stack or of a horizontal row of packages which have to be selectively manipulated to obtain access to a desired package.

A chosen package is picked from its position in the rack of bins and, if part of a stack or row of packages, from its position within the stack or row, in preparation for dispensing the package at an access bay in the front end interface unit. Each of the bin floors 16 has a slot 18 which is generally centered within the floor and which extends from the front access side 19 of the bin to a position near the rear of the bin.

As shown in FIG. 1, a pick head 20 is mounted on a vertically reciprocal carriage 21 which is driven by a belt drive 22 along a vertical guide rail 23. The rail 23 is mounted between two horizontally reciprocal carriages 24. The carriages 24 are driven by belt drives 26 along horizontal rails 28. The carriages 21 and 24 move in a plane which extends parallel to a front access side 19 of the bin rack 11. In this way, the pick head 20 can be placed adjacent any selected one of the bins 12 at the front access side 19 of the bin rack.

Figure 7:
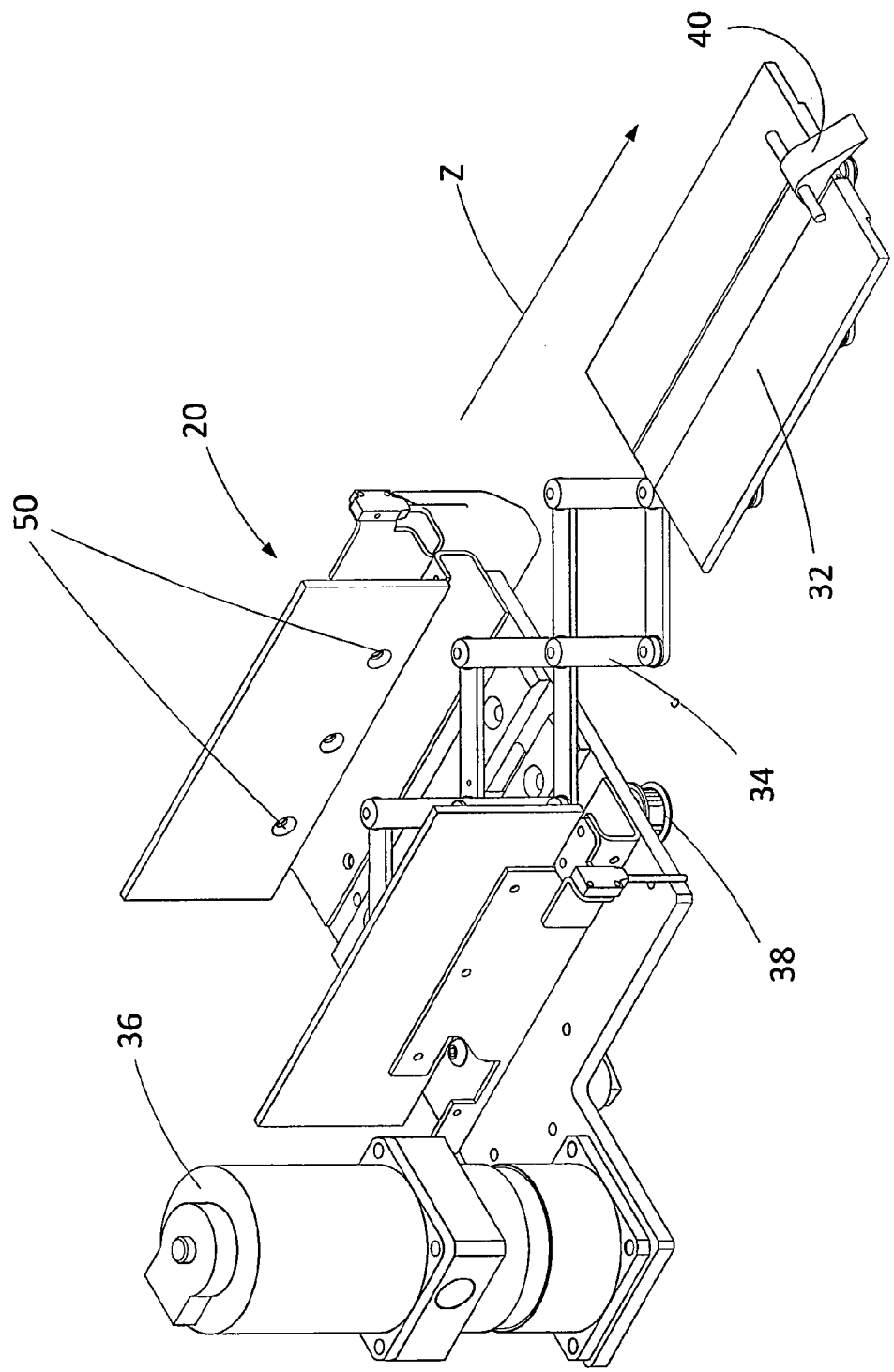
FIG. 7 is a perspective view corresponding to FIG. 5, but showing a reciprocal platform thereof in an extended position.
Figure 20:
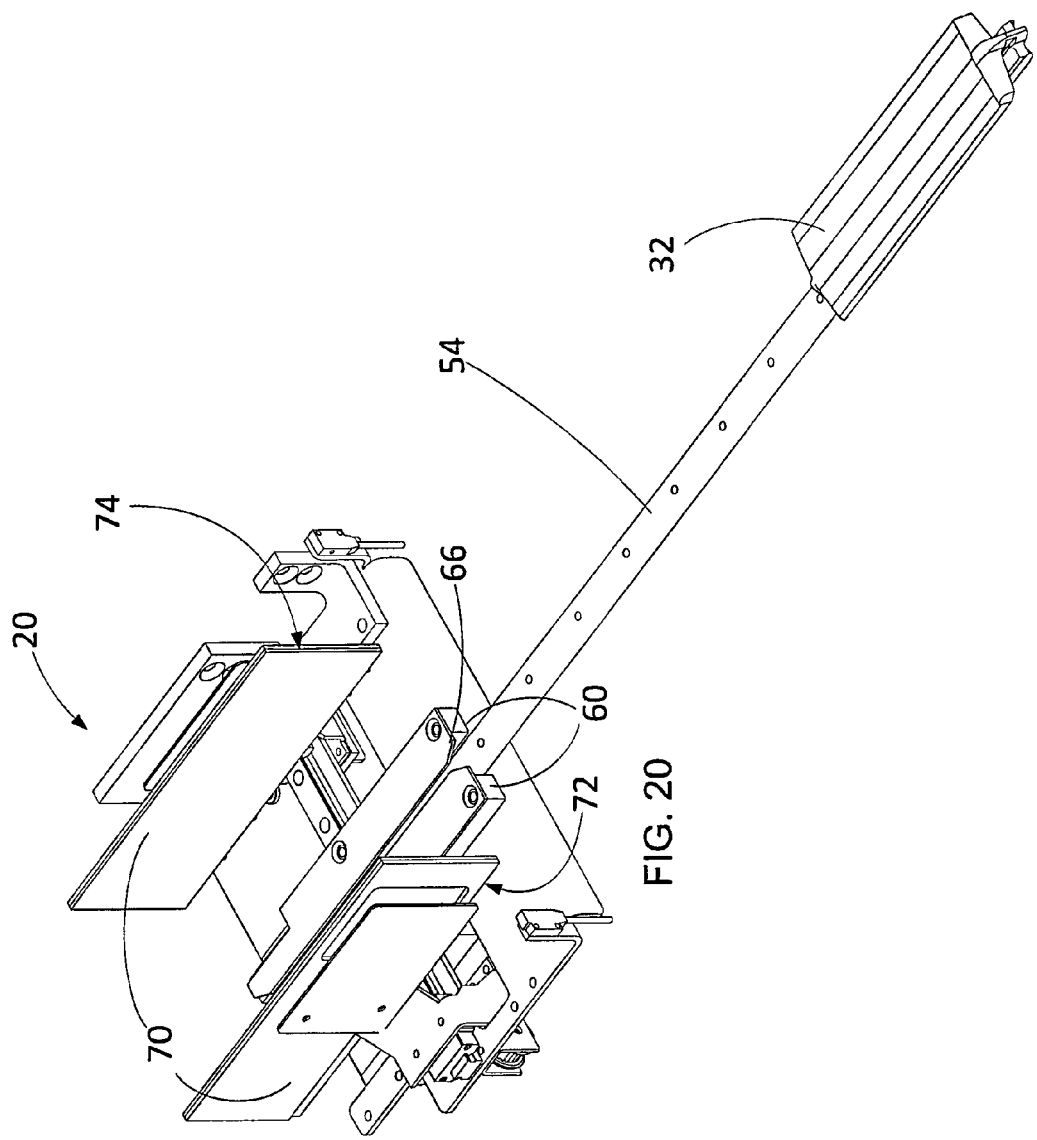
FIG. 20 is a perspective view corresponding to FIG. 17 but showing the pick head in an extended condition.

In one embodiment of the invention, and as shown in perspective view in FIGS. 5 and 7, the pick head 20 includes a platform 32 and a scissors type telescopic supporting linkage 34 (FIG. 7) driven by a motor 36 and a belt 38. The motor and belt operate to drive the platform 32 reciprocally in the Z direction (as shown by the arrow in FIG. 7) rearwardly towards the selected bin from which a package is to be picked, and then forwardly to drag the picked package out of the selected bin and onto the platform 32 from where the selected package can be carried by the pick head 20 to various stations within the apparatus, such as checking and labeling stations (not shown) before being dispensed to a user. To reduce the chance of a package being dislodged or wrongly positioned on the platform as it is dragged from the selected bin, the platform can be formed with an upper surface that slopes downwardly towards, or is recessed at, a generally central region, so that a package supported on the platform is biased by its own weight towards the central region.

The platform has an upwardly facing cam formation 40 (shown enlarged in the scrap view of FIG. 6), the projection having a rear cam face 42 and a forward abutment face 44. To initiate a pick process, the platform 32 is driven by linkage 34 into the bin rack as shown in FIGS. 8 and 9. The platform is at a height at which it slides under the floor 16 of the selected bin as shown in FIGS. 10 and 11. As the platform is driven into the bin rack, the projection 40 passes along the slot 18 in the floor 16 of the selected bin with a top part of the projection 40 extending above the upper surface of the floor. A cross member 45 extending through the projection 40 is positioned so that as the platform 32 enters the bin rack, the cross member 45 becomes inserted in the junction between the floor 16 of the bin and the package to be picked. The cross member 45 has a number of functions. Firstly, it is supported by the floor 16 of the selected bin as the platform enters the bin rack and so acts to prevent the platform 32 from sagging. The cross member also aids in guiding the projection 40 into a proper position for subsequent retrieval of a package from the selected bin. The cross member also keeps the package being picked relatively aligned with the direction of pick head exit throughout the pick process. Finally, the cross member is of value in separating a package from the floor 16 of the selected bin and, in terms of depth, in separating a package from an adjacent package within a row of packages.

As alluded to previously, during a package picking cycle, the platform is driven rearwardly into the bin rack to pick up a desired package from the selected bin 12 and then is driven forwardly out of the bin rack to drag the picked package from the selected bin. Successive phases of the platform movement are shown as sectional views in FIGS. 8, 10, 11 and 12. In FIG. 10, the platform 32 has reached a position in its rearward movement in which the cam face is starting to lift a pill bottle 46 from the bin floor 16 and also forcing the bottle to tilt with the mouth end of the bottle 46 raised above the bin floor. As shown in FIG. 11, the platform has moved further rearwardly to a position where it has passed under the bottle's center of gravity and the bottle is repositioned to alter its angle of tilt relative to the bin floor. After still further rearward motion of the platform, the platform reaches a drop position as shown in FIG. 12 at which the bottle 46, under its own weight, drops down against the bin floor with the abutment face 44 located adjacent a trailing extremity of the pill bottle 46. At this point, drive to the platform provided by the telescopic linkage 34 is reversed. As shown in FIG. 13, as the platform 32 moves forwardly out of the bin rack, the abutment face 44 bears against the bottle 46 to drag the bottle out of the selected bin with the bottle falling onto the platform and becoming supported by it as the platform emerges from the rack.

In the embodiment shown in FIGS. 8 through 13, the package to be picked forms part of a row of packages with part of an immediately rearwardly adjacent pill box 48 being shown. As can be seen, as a result of the lifting and tilting movement of the pill bottle 46 and pill box 48 during the course of the pick cycle, the opposed ends of the two packages are forced apart. This has particular value in relation to two common problems in dispensing packages, especially in dispensing pill boxes from a row of such boxes.

One problem of dispensing articles such as pill boxes which are relatively lightweight is that packages may stick together causing two boxes to be loaded onto the pick head platform rather than one package. In the storage bin, two package boxes may be caused to stick together if they press against each other for a long period during storage, especially if the boxes are made of cardboard and have been subjected to humid conditions. This increases the chance that when the pick head lifts one box, it may actually lift both, creating a double pick error. The passage of the cam formation 40 completely under the first box—the package to be picked—and partly under a rearwardly adjacent box tends to cause a separation angle to open up between the two packages and, additionally, forces the packages incrementally from their stored positions to establish a temporary height difference at the interface of the two packages. If the attraction between the stuck faces is overcome in the course of the projection passing progressively under the two packages, then only the package intended to be picked will be dragged from the selected bin.

Figure 22:
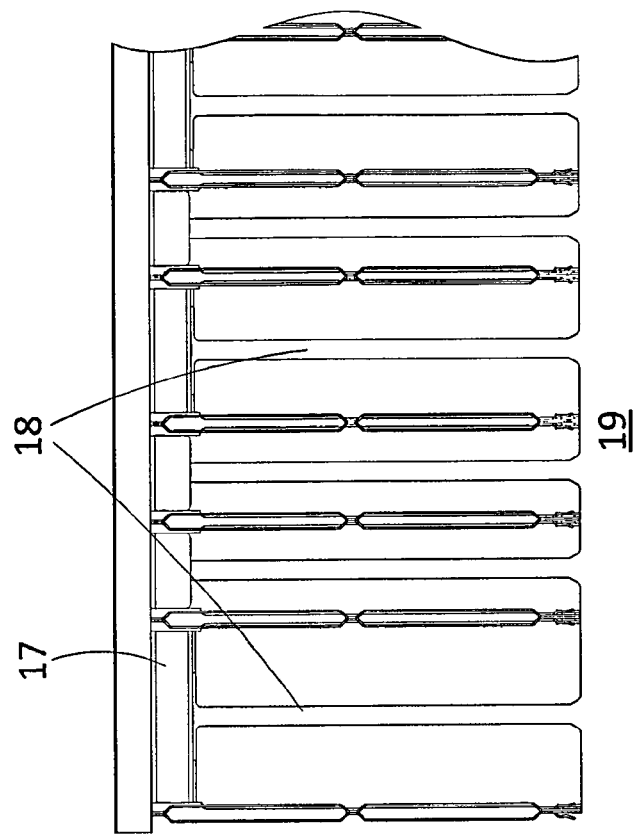
FIG. 22 shows a top view of the detail of FIG. 21.
Figure 21:
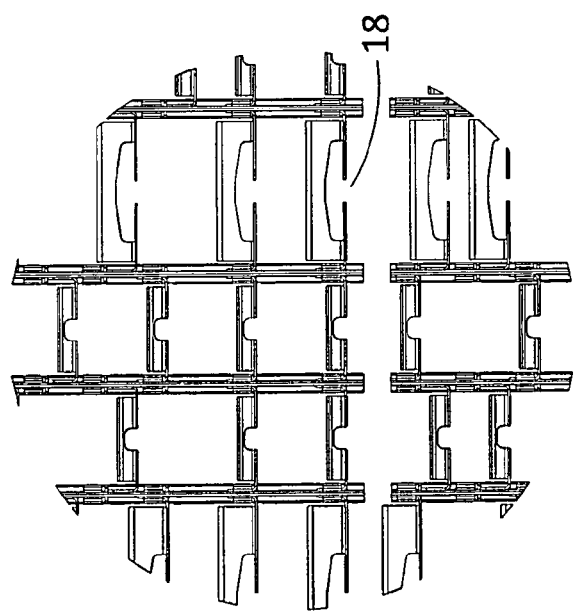
FIG. 21 shows a detail from the front of a rack of bins forming part of a storage apparatus according to an embodiment of the invention.

A back end storage bin rack such as that shown in FIGS. 1 and 2 may be implemented with one standard bin size or, as shown in FIGS. 21 and 22, as a combination of different bin sizes enabling packages of diverse shapes and sizes to be stored. In addition, the storage bins may hold standard or non-standard sized pill bottles or boxes or other medicaments such as bulk medication storage containers, bandages, etc. Some or all of the storage bins may be located in a zone of the bin rack which is at room temperature, while others may be located in a controlled temperature section such as a refrigerated zone for proper storage of medicaments that are prone to deterioration at room temperature. If desired, a reconstitution, mixing and/or compounding bulk medication storage container can be present in an over-large bin, the container housing one or more elements to be picked by the pick head.

At the time of a package pick by the control system, the package characteristics are known because each package is measured and its dimensions recorded in the course of the package being serialized and put into inventory in a selected bin of the bin rack. Also recorded are any or all of the package's weight, shape, moment arm, and other particulars pertaining to the location and nature of the package and each of these can be used in the package handling control algorithm.

As shown in FIG. 5, sensors 50 at the pick head 20 sense the size of the package that has been picked to determine that a single package has been picked and to determine that there have been no common errors such as a stuck pick, where the package sits in place due, for example, to slipperiness, or a double pick, where two packages in close proximity are either tangled or stuck together. The control system, using input from the sensors and specific data for the package being picked, determines likely errors and initiates appropriate control maneuvers to try to overcome a problematic pick. Obviously, characteristics of the packages other than or in addition to size can be sensed by sensors incorporated in the pick head. Such characteristics can include, for example, shape and/or weight.

An alternative design of platform and drive is shown in the embodiment of FIGS. 14 to 16. The platform 32 is fixed to one end of a spool 52 of actuator tape 54. The tape is a heavy duty version of retracting tape rule. As is known in the tape rule art, the actuator tape has a curved lateral profile. This allows the tape to be readily bent in one direction to allow compact storage on the spool 52 when the spool is wound up but resists bending in the opposite direction whereby it can drive the platform 32 and a medicament package supported by the platform in a pick or load operation when the spool is unwound. The platform 32 is somewhat narrower than the platform of the FIG. 8 embodiment and has an end region formed with a tapered blade 58 with a cam face 42 and an abutment face 44 having the same function as the cam and abutment faces, 42, 44, of the projection 40 in the FIG. 8 embodiment. This particular embodiment can be used with a bin without a slotted floor. In a pick operation, after the pick head 20 reaches the desired XY position, the spool 52 of actuator tape is driven to unwind the tape 54 so that the platform 32 is driven rearwardly towards the selected bin. As best shown in FIG. 16, the platform 32 is brought to a position where the leading edge of the tapered blade 58 is aligned with the upper surface of floor of the selected bin 12 so that further rearward motion of the platform acts to insert the tip of the blade between the bin floor 16 and the foremost package stored in the bin. As the spool is further unwound, the tapered blade 58 is driven rearwardly along the floor 16 of the bin with the cam face 42 operating to raise the desired package and with the platform 32 supported on the floor of the selected bin. The desired package 46 is prevented from moving rearwardly in the bin 12 either by the back wall 17 (not shown) or by a next adjacent package in a row of such packages which is prevented from rearward motion by wall 17. With the rearward motion of the desired package prevented or halted, the desired package rides up and over the cam formation 42 onto the platform 32 as the platform is driven rearwardly into the selected bin. Subsequently, the platform is withdrawn from the bin rack as the spool 52 is rewound so as to withdraw the desired package 46 which is then supported by the platform. The abutment face 44 acting on the desired package assists in the withdrawal of the package if the force of engagement between the platform upper surface and the desired package is insufficient to drag the package out of the bin rack, or if minor jamming occurs and must be overcome.

In contrast to the FIG. 8 embodiment, the FIG. 14 embodiment can be readily utilized for loading packages into selected bins 12 as an alternative to manual loading. In the loading process, a package is loaded onto the platform 32 with the pick/load head 20 located at a receiving station in the dispensary kiosk. The pick/load head is then operated to bring the platform and the package supported by it to the selected bin. The spool 52 is then unwound in an operation similar to that taking place in the pick process. As the platform 32 moves rearwardly into the selected bin 12, the supported package is driven as far as is permitted depending on what other packages are already stored in the bin. Subsequently, the tape spool is reversed to retrieve the platform from the selected bin, but only after a barrier not shown) mounted on the pick head 20 is moved to a position at which the platform 32 can exit the selected bin, but any package supported on the platform is preventing from being dragged or driven out of the bin.

A variation of the FIG. 14 embodiment is shown in FIGS. 17 to 19. Like the FIG. 14 embodiment, the pick head 20 uses a spool drive 52 as shown in FIGS. 18 and 19. Tape at the pick head inboard end is confined and supported by two retainer plates 60 as the spool 52 is unwound and, similarly to the FIG. 14 embodiment, is supported by the engagement of the platform 32 sliding onto the floor of a selected bin at the tape outboard end. In the FIG. 17 embodiment, the platform 32 combines features of the FIG. 14 and FIG. 8 embodiments. Thus the platform 32 is adapted for use with a storage bin having a front to rear slot (not shown) of the sort described with respect to the FIG. 8 embodiment. The platform has an integral web part 62 extending down from a main body part 63 of the platform, and a rail 64 extending laterally on either side of the web part. The web part moves within the bin floor slot as the platform 32 is driven into and out of the bin rack. The main body part 63 of the platform slides over the upper surface of the bin floor and is supported by it, while the rail 64 slides along the undersurface of the bin floor. As the platform nears its home station position in the pick head, the web part 62 moves between the retainer plates 60 with the rail under edge flanges 66 of the retainer plates.

The platform has a cam formation 40 which projects above the bin floor but also has narrower central section 68 which, in use, extends down into the bin floor slot. A particular value of the cam formation is that the leading end of the platform 32 lifts and slides under any package that is very thin or that has a thin layer lying adjacent the bin floor which is encountered by the platform as it moves into the storage rack.

As mentioned with respect to the FIG. 14 embodiment, at certain junctures in the package picking and loading procedures, it is desirable to withdraw the platform 32 without withdrawing a package that is supported on the platform, or without withdrawing such a package any further than a predetermined position. As shown in FIG. 17, a barrier arrangement is provided by spaced plates 70 which can be driven perpendicularly to the pick head Z-axis to increase and decrease the spacing of the plates.

In operation, during a package loading procedure, the platform supporting the package to be loaded is driven into the bin rack. Once the package is in place, the plates 70 are driven to reduce their spacing and the platform 32 is withdrawn from the bin rack. The platform slides under lower edges 72 of the plates towards its home station in the pick head while the package which has been loaded in the selected bin and hitherto supported by the platform is blocked from exiting the selected bin by vertical edges 74 of the plates 70. The platform has a radiused rear formation 76 to reduce the risk of jamming of a package against the barrier as the platform 32 travels out of the bin rack. The plates have adjunct functions to both grip a package which has been picked from the bin rack when the picked package reaches a desired position in the pick head and also to center the package in the pick head.

As previously mentioned, packages may be stored in a bin rack either with one package in a bin, or with a row or stack of packages in a bin. The manipulation of a row of packages has already been described with reference to the illustrated embodiments. In the case of a vertical stack of packages, the pick head platform and a barrier of the sort described with respect to FIG. 17 can be used to pick and extract the lowermost package in the stack, allowing upper members of the stack to drop. Similarly, a combination of camming and abutment formations together with a barrier of the sort described platform can be used to enable a package to be loaded under a resident stack of packages within a storage bin. In addition if it is desired to pick or place a package in an intermediate position in a stack or row, the pick head can be used to pick and temporarily park packages from a stack or row in an adjacent bin until a desired package is exposed for picking or until a desired location is exposed for loading.

Although in the preferred embodiments described herein, the bins are located in a rack as an array of rows and columns, other arrays are possible such as a radial array or a diagonal array. In such arrays, the rectangular form of bin may not be optimal and alternative bin shapes may be of advantage. In such alternative embodiments, the lower wall or floor of the bin may not extend horizontally or may not extend horizontally over its full extent. In addition, while it is convenient to have a pick head that moves in a Z direction in relation to a bin rack generally mounted in an XY plane, the pick head drive may be implemented to effect a movement of the pick head into the bin rack in a locus which is not linearly along a z-axis. For example, the pick head is moved over an arcuate path or packages are held in one position and then twisted into a desired position as they are loaded or withdrawn from a storage bin.

In the embodiments described, packages in a bin are acted upon by gravity and this interaction of the stored packages with the platform upper surface, the abutment edges and cam formations permits a ready and simple implementation of platform entry and exit to effect picking and loading of a package relative to a selected bin. While the effect of the packages' own weight is convenient, the effect of gravity may be replaced by or supplemented by having a stored package acted upon by a bias such as a spring bias. Such a bias can be applied permanently white the package is in a bin or at the pick head or may be acted upon in the course of platform movement into and out of the bin rack. In such an arrangement, cam and/or abutment formations may act in a manner similar to the illustrated embodiments, but the package to be picked or loaded is moved against and by the action of the bias as opposed to or in addition to gravity.

Other variations and modifications will be apparent to those skilled in the art. The embodiments of the invention described and illustrated are not intended to be limiting. The principles of the invention contemplate many alternatives having advantages and properties evident in the exemplary embodiments.

What is claimed is:

1. A method for retrieving a package from a rack of storage bins in a row and column array, each said storage bin having a floor supporting the package, and each package having a leading portion and an opposing trailing portion, the method comprising:
   driving a pick head having a platform to an access location corresponding to a selected said storage bin, wherein the platform has a projection therefrom that has a leading portion and an opposing trailing portion; and
   telescoping the platform into the selected said storage bin in the rack from the access location of the pick head such that:
      the leading portion of the projection progressively tilts the leading portion of the package away from and off of the floor in the selected said storage bin as the leading portion of the projection progressively telescopes into the selected said storage bin under the package;
      the trailing portion of the projection progressively tilts the trailing portion of the package towards and back on to the floor in the selected said storage bin as the trailing portion of the projection progressively telescopes under and past the trailing portion of the package; and
   telescoping the platform out of the selected said storage bin in the rack from the access location of the pick head such that the trailing portion of the projection engages the trailing portion of the package to drag the package on the floor out of the selected said storage bin.

2. The method as defined in claim 1, wherein the trailing portion of the projection is selected from a group consisting of:
   a top surface of the platform engaging the trailing portion of the package; and
   an abutment projecting upwardly from the platform
   a structure that separates the package from an adjacent said package on the floor of the selected said storage bin after the trailing portion of a cam on the platform is between the packages on the floor of the selected said storage bin.

3. The method as defined in claim 1, wherein the pick head includes an arrestor mechanism operable to halt the dragging of the package from the selected said storage bin in the course of the platform telescoping out of the selected said storage bin.

4. The method as defined in claim 1, wherein the projection is formed as an end region of the platform.

5. The method as defined in claim 4, wherein the pick head drive unit has:
   a first drive component to drive the pick head generally vertically; and
   a second drive component to drive the pick head generally horizontally.

6. The method as defined in claim 1, wherein:
   each said storage bin has opposed side walls, and an upper wall; and
   the walls of a plurality of the bins form common walls with respective immediately adjacent said bins.

7. The method as defined in claim 1, wherein:
   the platform is in communication with a spool of drive tape that is unwound and wound to respectively drive the platform into and out of the selected said storage bin in the rack from the access location of the pick head drive.

8. A method for retrieving a package from a rack of storage bins in a row and column array, each said storage bin having a floor supporting the package, and each package having a leading portion and an opposing trailing portion, the method comprising:
   driving a pick head having a platform to an access location corresponding to a selected said storage bin, wherein the platform has a cam with a leading portion and an opposing trailing portion; and
   opening a scissor-type device to telescope the platform into the selected said storage bin in the rack from the access location of the pick head such that:
      the leading portion of the cam progressively tilts the leading portion of the package away from and off of the floor in the selected said storage bin as the leading portion of the cam progressively telescopes into the selected said storage bin under the package;
      the trailing portion of the cam progressively tilts the trailing portion of the package towards and back on to the floor in the selected said storage bin as the trailing portion of the cam progressively telescopes under and past the trailing portion of the package; and
   closing the scissor-type device to telescope the platform out of the selected said storage bin in the rack from the access location of the pick head such that the trailing portion of the cam engages the trailing portion of the package to drag the package on the floor out of the selected said storage bin.

9. The method as defined in claim 8, wherein the pick head including an arrestor mechanism operable to halt the dragging of the package from the selected said storage bin in the course of the platform telescoping out of the selected said storage bin.

10. The method as defined in claim 8, wherein the cam is formed as an end region of the platform.

11. The method as defined in claim 8, wherein the scissor-type device is operable to:
   drive the pick head generally vertically; and
   drive the pick head generally horizontally.

12. The method as defined in claim 8, wherein the platform, upon entry to and exit from the rack:
   at least a part of the platform is guided within a slot in the floor of the selected said storage bin; and
   an upper part of the cam projects above the floor of the selected said storage bin.

13. The method as defined in claim 8, wherein the trailing portion of the cam separates the package from an adjacent said package on the floor of the selected said storage bin after the trailing portion of the cam is telescoped between the packages on the floor of the selected said storage bin.

14. The method as defined in claim 8, wherein:
   the floor of the selected said storage bin has a slot extending from an access side of the selected bin:
   the platform engages the slot;
   each said storage bin has:
      opposed side walls;
      an upper wall; and
      a lower wall or floor;
   and
   a wall of a plurality of the bins form common walls with respective immediately adjacent said bins.

15. A method for retrieving a package from a rack of storage bins in a row and column array, each said storage bin having a floor supporting the package, and each package having a leading portion and an opposing trailing portion, the method comprising:

driving a pick head having a platform to an access location corresponding to a selected said storage bin, wherein the platform has a cam with a leading portion and an opposing trailing portion;

unwinding a spool of drive tape to drive the platform into the selected said storage bin in the rack from the access location of the pick head such that:

the leading portion of the cam progressively tilts the leading portion of the package away from and off of the floor in the selected said storage bin as the leading portion of the cam progressively telescopes into the selected said storage bin under the package;

the trailing portion of the cam progressively tilts the trailing portion of the package towards and back on to the floor in the selected said storage bin as the trailing portion of the cam progressively telescopes under and past the trailing portion of the package;

and winding the spool of drive tape to drive the platform out of the selected said storage bin in the rack from the access location of the pick head such that the trailing portion of the cam engages the trailing portion of the package to move the package out of the selected said storage bin.

16. The method as defined in claim 15, wherein the pick head including an arrestor mechanism operable to halt the dragging of the package from the selected said storage bin in the course of the platform telescoping out of the selected said storage bin.

17. The method as defined in claim 15, wherein the cam is formed as an end region of the platform.

18. The method as defined in claim 15, wherein the platform, upon entry to and exit from the rack:

at least a part of the platform is guided within a slot in the floor of the selected said storage bin; and an upper part of the cam projects above the floor of the selected said storage bin.

19. The method as defined in claim 15, wherein the trailing portion of the cam separates the package from an adjacent said package on the floor of the selected said storage bin after the trailing portion of the cam is telescoped between the packages on the floor of the selected said storage bin.

20. The method as defined in claim 15, wherein:

the floor of the selected said storage bin has a slot extending from an access side of the selected bin:

the platform engages the slot;

each said storage bin has:

opposed side walls;

an upper wall; and a lower wall or floor;

and a wall of a plurality of the bins form common walls with respective immediately adjacent said bins.

* * * * *